United States Patent [19]

Emmons

[11] Patent Number: 4,710,303
[45] Date of Patent: Dec. 1, 1987

[54] LOW MOLECULAR WEIGHT POLYVINYL SULFONATE FOR LOW PH BARIUM SULFATE SCALE CONTROL

[75] Inventor: Daniel H. Emmons, Rosenberg, Tex.

[73] Assignee: Nalco Chemical Company, Naperville, Ill.

[21] Appl. No.: 896,354

[22] Filed: Aug. 14, 1986

[51] Int. Cl.$^4$ ................................................ C02F 5/10
[52] U.S. Cl. .................................. 210/698; 252/8.555; 210/701
[58] Field of Search ............................. 210/698, 701; 252/8.555, 180, 181

[56] References Cited

U.S. PATENT DOCUMENTS

| | | | |
|---|---|---|---|
| 3,682,224 | 8/1972 | Bleyle | 210/701 |
| 3,706,717 | 12/1972 | Siegele | 252/180 |
| 3,715,307 | 2/1973 | Johnson et al. | 210/701 |
| 3,879,288 | 4/1975 | Siegele | 252/180 |
| 3,951,793 | 4/1976 | Tate et al. | 210/698 |
| 4,048,066 | 9/1977 | Cuisia et al. | 210/701 |
| 4,062,796 | 12/1977 | Gardner et al. | 210/698 |
| 4,457,847 | 7/1984 | Lorenc et al. | 210/698 |
| 4,556,493 | 12/1985 | Cuisia | 210/698 |
| 4,560,481 | 12/1985 | Hollander | 252/181 |
| 4,604,211 | 8/1986 | Kneller | 210/701 |
| 4,618,448 | 10/1986 | Cha et al. | 210/698 |

Primary Examiner—Peter Hruskoci
Assistant Examiner—Coreen Y. Lee
Attorney, Agent, or Firm—John G. Premo; Anthony L. Cupoli; Donald G. Epple

[57] ABSTRACT

A method of preventing the formation of barium sulfate scale deposited by aqueous produced or injection fluids having a pH below 7.5 which are recovered with or are used to recover petroleum from underground formations which comprises treating these aqueous fluids with a low molecular weight polyvinyl sulfonate which has a molecular weight within the range of between 500–10,000.

2 Claims, No Drawings

LOW MOLECULAR WEIGHT POLYVINYL SULFONATE FOR LOW PH BARIUM SULFATE SCALE CONTROL

INTRODUCTION

Many enhanced oil recovery methods utilize the injection of aqueous fluids into underground petroleum bearing formations. These methods are well-known and need not be described. Often times the waters that are injected either into injection wells or recovered and pumped back into producing wells, e.g. "squeeze" operations, contain large amounts of scale-forming constituents, principally the salts of calcium, barium and magneseum.

Many inhibitors are available to inhibit calcium sulfate-calcium carbonate scale formation. Often times these inhibitors are phosphate esters, phosphonates or low molecular weight carboxylate polymers, and the like.

Recently, so-called carbon dioxide miscible floods have become very common. Basically, this procedure consists of pumping $CO_2$ gas into the reservoir under pressure, where, if conditions are right, the gas will become miscible with the oil, causing the viscosity of the oil to decrease and the crude to expand, and thus move more easily toward the production well. Frequently, the $CO_2$ "slug" is followed by alternate water and $CO_2$ injections (water alternating with gas, or water and gas).

The resulting environment of these floods is acidic, which results in an increase in corrosivity and a decrease in calcium carbonate scaling. The introduction of $CO_2$ can, however, lead to some other types of increased scaling. For instance, during a recent pilot test by a major producer for a $CO_2$ flood in Colorado, a sudden increase in barium sulfate scaling occurred after the injection of the $CO_2$, even though the system was treated with a scale inhibitor which had effectively controlled the barium sulfate in that field for several years. The formation of the barium sulfate scale in this pilot test led to a laboratory project to examine the conditions under which barium sulfate scale would precipitate in the presence of inhibitors, and to attempt to prevent that precipitation.

Floods of this type, as well as injection waters used in other types of recovery operations, have pH's below 7.5 and in certain instances pH's below 4. This acidic environment tends to produce barium sulfate scale which is not effectively controlled using conventional scale inhibitors such as low molecular weight carboxylate polymers. The lack of scale-reducing activity of such prior art polymers is increased as the pH of the injection waters decreases.

If it were possible to provide an improved barium sulfate scale inhibitor which was affective for treating a variety of aqueous produced or injection fluids, particularly carbon dioxide-treated fluids which had low pH's to provide effective barium sulfate control, an advance in the art would be afforded.

The problems associated with carbon dioxide EOR floods are described in the publication SPE 14407 entitled "A Laboratory Evaluation of Barium Sulfate Scale Inhibitors at Low pH for Use in Carbon Dioxide EOR Floods" by J. E. Ramsey and L. M. Cenegy, NL Treating Chemicals/NL Industries Inc., copyright 1985. This paper was prepared for presentation at the 60th Annual Technical Conference and Exhibition of the Society of Petroleum Engineers held in Las Vegas, NV Sept. 22–25, 1985, and is incorporated herein by reference.

THE INVENTION

A method of preventing the formation of barium sulfate scale deposited by aqueous produced or injection fluids having a pH below 7.5 which are recovered with or are used to recover petroleum from underground formations which comprises treating these aqueous fluids with a low molecular weight polyvinyl sulfonate which has a molecular weight within the range of between 500–10,000.

The polyvinyl sulfonates used are preferably those having a molecular weight range within the range of 1,000 to 5,000. These molecular weights are weight average molecular weights. The polymers, while preferably homopolymers, may contain up to 10 mole percent of other water-soluble vinyl monomers such as acrylic acid, maleic anhydride, 2-acrylamido, 2-methylpropane sulfonic acid, and the like. The homopolymers are preferred.

As indicated, these polymers are most effective when the pH of the aqueous produced or injection fluids are below 7.5. They are most effective in preventing barium sulfate scale where the aqueous fluids have a pH below 4. Usually the ph will be in the range of 2.5–4.

The amount of polymer required to effectuate good barium sulfate scale control should be at least 0.5 ppm based on the weight of the aqueous produced or injection fluid treated. Typical dosage ranges are between 1–25 ppm with a preferred dosage range being at least 5–10.

Preparation of the Sodium Vinyl Sulfonate Polymer

While any number of known methods may be used to prepare these polymers, a typical preparation is presented below as Example 1.

EXAMPLE 1

To a 500 ml. round bottom three neck reaction flask equipped with a stirrer was added 150.0 g of 25% aqueous sodium vinyl sulfonate. The flask and contents were purged with nitrogen for 30 minutes. The contents of the flask were heated to 60° C. and 0.4 g of Vazo 67* premixed in 10.0 g of isopropanol was added. The mixture was stirred while holding at 60° C. for five hours. After 5 hours the mixture was heated to reflux for 20 minutes then cooled. The resulting solution was slightly turbid.

To evaluate the polyvinyl sulfonate polymers for barium sulfate scale inhibition, the following test method was used:

| BaSO$_4$ Scale Test Test Brines | |
| --- | --- |
| Reagent | Grams/Liter |
| Brine A - Synthetic Field Brine | |
| NaCl | 20.018 |
| CaCl$_2$.2 H$_2$O | 1.323 |
| MgCl$_2$.6 H$_2$O | 1.626 |
| Na$_2$SO$_4$ | 0.399 |
| NaHCO$_3$ | 0.364 |
| Brine B - Ba$^{++}$ Brine | |
| BaCl$_2$.2 H$_2$O | 7.850 |
| Brine C - SO$_4$$^=$ Brine | |
| Na$_2$SO$_4$ | 4.750 |

*Vazo 67 - 2,2'-azobis-(2-methylbutyronitrile)

Test Procedure:
1. Add the appropriate amount of 6M HCl to Brine A.
2. Saturate Brine A with $CO_2$.
3. Add appropriate amount of inhibitor to 4 oz. bottle.
4. Add 98 ml of Brine A to bottle.
5. Add 1 ml of Brine B to bottle and mix.
6. Add 1 ml of Brine C to bottle, cap and mix.
7. Place in bath at 160° F. For 24 hours exposure.
8. Remove after exposure and analyze for $Ba^{++}$ retained in solution. The analytical method used to analyze for barium is accurate to within 5% of the actual barium level.

Using the above test methods, the following test results are presented:

COMPOSITIONS TESTED

Composition no. 1 is the polymer of Example 1.
Composition no. 2 is a phosphate ester.
Composition no. 3 is sodium hexametaphosphate.
Composition no. 4 is 1-hydroxyethylidene 1,1-diphosphonic acid.
Composition no. 5 is diethylenetriamine phosphonate.
Composition no. 6 is an acrylic acid maleic acid copolymer.
Composition no. 7 is an acrylic homopolymer.

| Barium Sulfate Scale Deposition Test Results Results in Percent Inhibition | | |
|---|---|---|
| Composition No. | Inhibitor Concentration (ppm) | |
| Test pH = 4.8 | 10 | 50 |
| 1 | 96 | 100 |
| 2 | 100 | 100 |
| 3 | 100 | 100 |
| 4 | 9 | 100 |
| 5 | 100 | 100 |
| 6 | 74 | 100 |
| 7 | 44 | 100 |
| Test pH = 4.2 | 10 | 50 |
| 1 | 100 | 100 |
| 2 | 61 | 100 |
| 3 | 96 | 100 |
| 4 | 4 | 19 |
| 5 | 24 | 28 |
| 6 | 44 | 87 |
| 7 | 44 | 76 |
| Test pH = 3.6 | 10 | 50 |
| 1 | 100 | 100 |
| 2 | 5 | 16 |
| 3 | 74 | 100 |
| Test pH = 2.9 | 5 | 10 | 50 |
| 1 | 98 | 100 | 100 |
| 3 | — | 53 | 100 |

Blank before precipitation = 44 mg/l $Ba^{++}$
Blank after precipitation = 1 mg/l $Ba^{++}$

Having thus described my invention, I claim:

1. A method of preventing the formation of barium sulfate scale deposited by aqueous produced or injection fluids having a pH below 7.5 which are recovered with or are used to recover petroleum from underground formations which comprises treating these aqueous fluids with from 1-25 ppm by weight of a low molecular weight water-soluble polyvinyl sulfonate which has a molecular weight within the range of between 500-10,000 and containing a minimum of 90 mole percent of vinyl sulfonate monomer.

2. The method of claim 1 wherein the pH of the aqueous fluid is below 4 and the molecular weight of the polyvinyl sulfonate is within the range of 1,000-5,000.

* * * * *